United States Patent [19]

Eimers et al.

[11] 4,225,483
[45] Sep. 30, 1980

[54] BORIC ACID ESTERS AND OXETANES FOR STABILIZING PHOSPHITE-FREE POLYCARBONATES

[75] Inventors: Erich Eimers; Rolf Dhein, both of Krefeld; Wolfgang Cohnen, Leverkusen, all of Fed. Rep. of Germany

[73] Assignee: Bayer Aktiengesellschaft, Leverkusen, Fed. Rep. of Germany

[21] Appl. No.: 953,131

[22] Filed: Oct. 20, 1978

[30] Foreign Application Priority Data

Nov. 9, 1977 [DE] Fed. Rep. of Germany ....... 2750043

[51] Int. Cl.$^2$ ............................ C08K 5/04; C08K 5/15
[52] U.S. Cl. ........................... 260/45.8 A; 260/45.7 R; 260/45.75 Q; 260/45.8 R
[58] Field of Search ..................... 260/45.7 R, 45.8 A, 260/45.8 RB, 45.75 Q

[56] References Cited

U.S. PATENT DOCUMENTS

| | | | |
|---|---|---|---|
| 3,021,303 | 2/1962 | Jibben | 260/45.7 R |
| 3,131,164 | 4/1964 | Doyle et al. | 260/45.7 R |
| 3,193,521 | 7/1965 | Jasching | 260/45.7 R |
| 3,205,240 | 9/1965 | Shepherd | 260/45.8 A |
| 3,321,435 | 5/1967 | Fritz et al. | 260/45.7 R |
| 3,360,498 | 12/1967 | Rawlings | 260/45.7 R |
| 3,404,122 | 10/1968 | Fritz et al. | 260/45.7 R |
| 3,452,054 | 6/1969 | Vona et al. | 260/45.8 A |
| 3,794,629 | 2/1974 | Eimers et al. | 260/45.8 A |
| 4,073,769 | 2/1978 | Eimers et al. | 260/45.8 A |
| 4,102,859 | 7/1978 | Eimers et al. | 260/45.8 A |

FOREIGN PATENT DOCUMENTS 2658849 7/1977 Fed. Rep. of Germany .

Primary Examiner—Hosea E. Taylor
Assistant Examiner—R. A. White
Attorney, Agent, or Firm—Gene Harsh; Lawrence S. Pope; Thomas W. Roy

[57] ABSTRACT

Phosphite-free polycarbonate molding compositions are provided which contain either a boric acid ester containing oxetane groups, a mixture of a boric acid ester containing oxetane groups and a boron-free oxetane compound or a mixture of a boric acid ester which is free from oxetane groups and a boron-free oxetane compound, in amounts between about 0.01 and 1% by weight, relative to the weight of pure polycarbonate resin. A process for stabilizing phosphite-free polycarbonate compositions to light and heat without impairing their resistance to hydrolysis is also provided by the incorporation of either a boric acid ester containing oxetane groups, a mixture of a boric acid ester containing oxetane groups and a boron-free oxetane compound or a mixture of a boric acid ester which is free from oxetane groups and a boron-free oxetane compound.

10 Claims, No Drawings

BORIC ACID ESTERS AND OXETANES FOR STABILIZING PHOSPHITE-FREE POLYCARBONATES

BACKGROUND OF THE INVENTION

It is known to stabilize polycarbonates with boric acid esters as per U.S. Pat. Nos. 3,321,435 and 3,404,122.

It is also known to stabilize polycarbonates with oxetane compounds as per U.S. Pat. Nos. 3,794,629 and 4,073,769 and German Published Patent Specification No. 2,658,849 which corresponds to U.S. patent application Ser. No. 644,934 filed Dec. 24, 1975, to Axelrod.

It is also known to stabilize polycarbonates by adding mixtures of boric acid esters containing oxetane groups and phosphites. (See German Published Patent Specification No. 2,510,463 and the corresponding U.S. Pat. No. 4,102,959.)

With the exception of the use of stabilizer mixtures according to German Published Patent Specification No. 2,510,463, the stabilizing possibilities hitherto known have certain disadvantages when the polycarbonates are subjected to extreme conditions; in particular, either the effect of stabilizing the polycarbonates to heat is insufficiently high or the resistance to hydrolysis is insufficiently high.

It has now surprisingly been found that polycarbonates can be effectively stabilized to light and heat, without the addition of phosphites and without impairing the resistance of the stabilized polycarbonate to hydrolysis, by incorporating either boric acid esters containing oxetane groups, a mixture of a boric acid ester containing oxetane groups and a boron-free oxetane compound or a mixture of a boric acid ester which is free from oxetane groups and a boron-free oxetane compound.

SUMMARY OF THE INVENTION

The present invention relates to phosphite-free polycarbonate molding compositions which contain either a boric acid ester containing oxetane groups, a mixture of a boric acid ester containing oxetane groups and a boron-free oxetane compound or a mixture of a boric acid ester which is free from oxetane groups and a boron-free oxetane compound in amounts between about 0.01 and 1% by weight, preferably between about 0.05 and 0.2% by weight, relative to the weight of pure polycarbonate resin.

The present invention also relates to a process for stabilizing phosphite-free polycarbonate molding compositions, characterized in that either boric acid esters containing oxetane groups, a mixture of a boric acid ester containing oxetane groups and a boron-free oxetane compound or a mixture of a boric acid ester which is free from oxetane groups and a boron-free oxetane compound are incorporated into the phosphite-free polycarbonates, by known methods, in amounts between about 0.01 and 1% by weight, preferably in amounts between about 0.05 and 0.2% by weight, relative to the weight of pure polycarbonate resin.

DETAILED DESCRIPTION OF THE INVENTION

The boric acid esters containing oxetane groups which can be used according to the invention can optionally be employed in combination with boron-free oxetane compounds, the molar ratio of boron atoms to oxetane groups in these combinations being between about 1:2 and 1:10, preferably between about 1:3 and 1:6.

Instead of the boric acid esters containing oxetane groups which can be used according to the invention, it is also possible to employ mixtures of boric acid esters which are free from oxetane groups with boron-free oxetane compounds, the molar ratio of boron atoms to oxetane groups in these mixtures also being between about 1:2 and 1:10, preferably about 1:3 and 1:6.

Boric acid esters containing oxetane groups which can be used according to the invention are those of the structural formula (I)

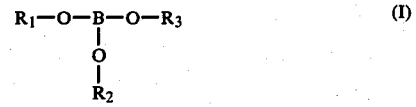

wherein at least one of the radicals $R_1$, $R_2$ and $R_3$ is the radical of a monoalcohol containing oxetane groups, while at most 2 of the radicals $R_1$, $R_2$ and $R_3$ are radicals of primary, secondary or tertiary aliphatic, cycloaliphatic or heterocyclic monoalcohols which are free from oxetane groups or monohydroxyaryl compounds which are free from oxetane groups.

Monoalcohols containing oxetane groups which are preferably suitable are those of the formula (II)

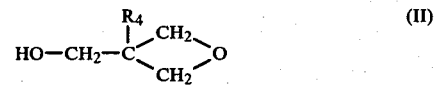

wherein
$R_4$ is H, $C_1$–$C_{18}$-alkyl, $C_3$–$C_{12}$-cycloalkyl, optionally alkyl-substituted $C_6$–$C_{14}$-aryl, $C_7$–$C_{18}$-aralkyl or —$CH_2$—O—$R_5$,
wherein
$R_5$ in turn can be the alkyl, cycloalkyl, aryl and aralykl given for $R_4$.
$R_4$ is preferably a $C_1$–$C_5$-alkyl radical.

Examples of suitable monoalcohols, containing oxetane groups, of the formula (II) are 3-hydroxymethyloxetane, 3-methyl-3-hydroxymethyloxetane, 3-ethyl-3-hydroxymethyloxetane, 3-pentyl-3-hydroxymethyloxetane, 3-hexadecyl-3-hydroxymethyloxetane, 3-octadecyl-3-hydroxymethyloxetane, 3-cyclohexyl-3-hydroxymethyloxetane, 3-phenyl-3-hydroxymethyloxetane, 3-p-tolyl-3-hydroxymethyloxetane, 3-benzyl-3-hydroxymethyloxetane, 3-methoxymethyl-3-hydroxymethyloxetane, 3-ethoxymethyl-3-hydroxymethyloxetane, 3-butoxymethyl-3-hydroxymethyloxetane, 3-octadecylmethyl-3-hydroxymethyloxetane, 3-phenoxymethyl-3-hydroxymethyloxetane, 3-p-tolyl-oxymethyl-3-hydroxymethyloxetane and 3-benzyloxymethyl-3-hydroxymethyloxetane.

Examples of further suitable monoalcohols containing oxetane groups, which do not correspond to the formula (II), are 3-phenoxy-3-hydroxymethyloxetane, 3-p-chlorophenoxy-3-hydroxymethyloxetane, 3-p-tert.-butylphenoxy-3-hydroxymethyloxetane, 3-acetyloxymethyl-3-hydroxymethyloxetane and 3-stearoyloxymethyl-3-hydroxymethyloxetane.

Examples of monoalcohols and monohydroxyaryl compounds which are free from oxetane groups and are suitable for the preparation of the boric acid esters of the formula (I) are primary, aliphatic $C_1$–$C_{18}$-monoalcohols which are free from oxetane groups, secondary, aliphatic $C_3$–$C_{18}$-monoalcohols which are free from oxetane groups and tertiary, aliphatic $C_4$–$C_{18}$-monoalcohols which are free from oxetane groups; further suitable examples are secondary, cycloaliphatic $C_3$–$C_{12}$-monoalcohols which are free from oxetane groups, primary, cycloaliphatic $C_4$–$C_{12}$-monoalcohols which are free from oxetane groups or tertiary, cycloaliphatic $C_4$–$C_{12}$-monoalcohols which are free from oxetane groups, and examples which are also suitable are primary, secondary or tertiary heterocyclic $C_3$–$C_{12}$-monoalcohols which are free from oxetane groups. Examples of suitable monohydroxy compounds which are free from oxetane groups are: methyl alcohol, ethyl alcohol, N-propyl alcohol, isopropyl alcohol, N-butyl alcohol, isobutyl alcohol, tert.-butyl alcohol, n-hexyl alcohol, 2-ethyl-hexan-1-ol, decyl alcohol, lauryl alcohol, octacecyl alcohol, S-ethylene thioglycol, S-dodecyl thioglycol, cyclohexyl alcohol, 2-methylcyclohexyl alcohol, cyclobutanol, cyclopropanol, benzyl alcohol, α-methylbenzyl alcohol, tetrahydrofurfuryl alcohol, 5-hydroxymethyl-5-ethyl-1,3-dioxane, ethylene glycol monobutyl ester, diacetin, trimethylolpropane diallyl ether, phenol, 2,6-diisobutyl-p-methylphenol, α-naphthol, β-naphthol and p-chlorophenol.

Examples of boric acid esters, containing oxetane groups, of the formula (I) which can be used according to the invention are tris-(2,2-dimethylene oxide-butyl)-borate, bis-(2,2-dimethylene oxide-butyl)phenyl borate, 2,2-dimethylene oxide-butyl bis-(phenyl)borate, bis-(2,2-dimethylene oxide-butyl)decyl borate, bis-(2,2-dimethylene oxide butyl)p-tolyl borate, 2,2-dimethylene-butyl bis-(o-chlorophenyl)borate, bis-(2,2-dimethylene oxide-butyl)benzyl borate, bis-(2,2-dimethylene oxide-butyl)octadecyl borate, bis-(2,2-dimethylene oxide-butyl)methyl borate, bis-(2,2-dimethylene oxide-butyl)cyclohexyl borate, 2,2-dimethylene oxide-butyl bis-(decyl)borate, tris-(2,2-dimethylene oxide-propyl) borate, bis-(2,2-dimethylene oxide-propyl)phenyl borate, 2,2-dimethylene oxide-propyl bis-(phenyl)borate, tris-(2,2-dimethylene oxide-octadecyl)borate, tris-(2,2-dimethylene oxide-2-phenyl-ethyl)borate, bis-(2,2-dimethylene oxide-2-phenyl-ethyl)phenyl borate, tris-(2,2-dimethylene oxide-2-p-tolyl-ethyl)borate, tris-(2,2-dimethylene oxide-3-phenyl-propyl)borate, tris-(2,2-dimethylene oxide-3-methoxy-propyl)borate, tris-(2,2-dimethylene oxide-3-ethoxy-propyl)borate, tris-(2,2-dimethylene oxide-3-butoxy-propyl)borate, tris-(2,2-dimethylene oxide-3-octadecyloxy-propyl)borate, tris-(2,2-dimethylene oxide-3-phenoxy-propyl)borate and tris-(2,2-dimethylene oxide-3-benzyloxy-propyl)borate.

Boric acid esters which can be used according to the invention are also those of polyalcohols containing oxetane groups, in particular of dialcohols containing oxetane groups. The boric acid esters of dialcohols containing oxetane groups correspond to the following structural formulae (IIIa) or (IIIb)

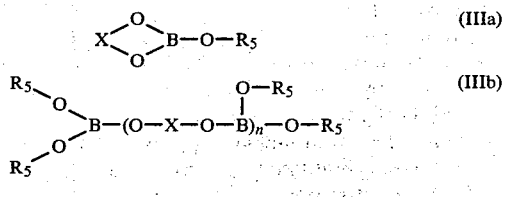

(IIIa)

(IIIb)

wherein

X is the radical of a dialcohol HO—X—OH containing oxetane groups, in which

X is an organic radical, containing oxetane groups, with, for example, 5 to 20 C atoms, $R_5$ is the radical of a monoalcohol which is free from oxetane groups or of a monohydroxyaryl compound which is free from oxetane groups and "n" is an integer from 1 to 10 inclusive, preferably from 1 to 3 inclusive and in particular 1 or 2.

Suitable monoalcohols $R_5$—OH which are free from oxetane groups and monohydroxyaryl compounds $R_5$—OH which are free from oxetane groups are those which have already been mentioned in characterizing the boric acid esters (I).

Examples of dialcohols HO—X—OH containing oxetane groups are

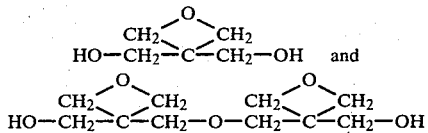

Examples of boric acid esters having the structure (IIIa) or (IIIIb) are

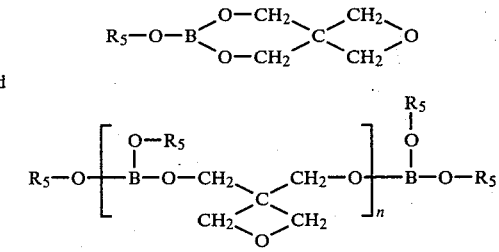

and wherein $R_5$ and "n" have the meaning given for the structural formulae (IIIa) and (IIIb).

Boric acid esters which can be used according to the invention are also those of monoalcohols containing oxetane groups and aliphatic, cycloaliphatic or heterocyclic polyalcohols, preferably dialcohols, which are free from oxetane groups and/or polyhydroxyaryl compounds, preferably dihydroxyaryl compounds, which are free from oxetane groups.

Examples of polyalcohols which are free from oxetane groups are those with 2 to 20 C atoms, such as, for example, ethylene glycol, 1,2-propanediol, 2,2-dimethylpropanediol, 2-methylenepropane-1,3-diol, 2,2-dimethyl-4,4-dimethylcyclobutane-1,3-diol, glycerol, trimethylolpropane, pentaerythritol, sorbitol, thiodiglycol, diethylene glycol, triethylene glycol, 2-ethylpropane-1,3-diol, 1,4-butanediol, 1,4-but-2-enediol, 1,6-n-hexanediol, 4,4′-bis-hydroxycyclohexyl-2,2-propane, cyclohexyl-1,4-dimethanol and 1,3-hydroxy-2,2,4,4-tetramethylcyclobutane.

Examples of polyhydroxyaryl compounds which are free from oxetane groups are those with 6 to 30 C atoms, such as, for example, hydroquinone, resorcinol, pyrocatechol, di-t-butyl-pyrocatechol and 4,4′-dihydroxydiphenyl, bis-(hydroxyphenyl)-alkanes, such as, for example, $C_1$–$C_8$-alkylene- and $C_2$–$C_8$-alkylidene-bisphenols, bis-(hydroxyphenyl)-cycloalkanes, such as, for example, C₅–C₁₅-cycloalkylene- and C₅–C₁₅-cycloalkylidene-bisphenols, α,α'-bis-(hydroxyphenyl)-diisopropylbenzene and the corresponding nuclear-alkylated and nuclear-halogenated compounds, for example 2,2-bis-(4-hydroxyphenyl)-propane (bisphenol A), 2,2-bis-(4-hydroxy-3,5-dichlorophenyl)-propane (tetrachlorobisphenyl A), 2,2-bis-(4-hydroxy-3,5-dibromophenyl)-propane (tetrabromobisphenol A), 2,2-bis-(4-hydroxy-3,5-dimethylphenyl)-propane (tetramethylbisphenol A), 1,1-bis-(4-hydroxyphenyl)-cyclohexane (bisphenol Z) and α,α'-bis-(4-hydroxyphenyl)-p-diisopropyl-benzene, dihydroxynaphthalenes, dihydroxyanthracenes, phloroglucinol, pyrogallol, bis-(2-hydroxy-3-tert.-butyl-phenyl)-methane, bis-(2-hydroxy-3-cyclohexyl-phenyl)sulphide, bis-(2-hydroxy-3-methylphenyl)ether and 2,2-bis-(2-hydroxy-3-tert.-butyl-5-methylphenyl)-propane.

Examples of oxetane-containing boric acid esters with polyalcohols which are free from oxetane groups are

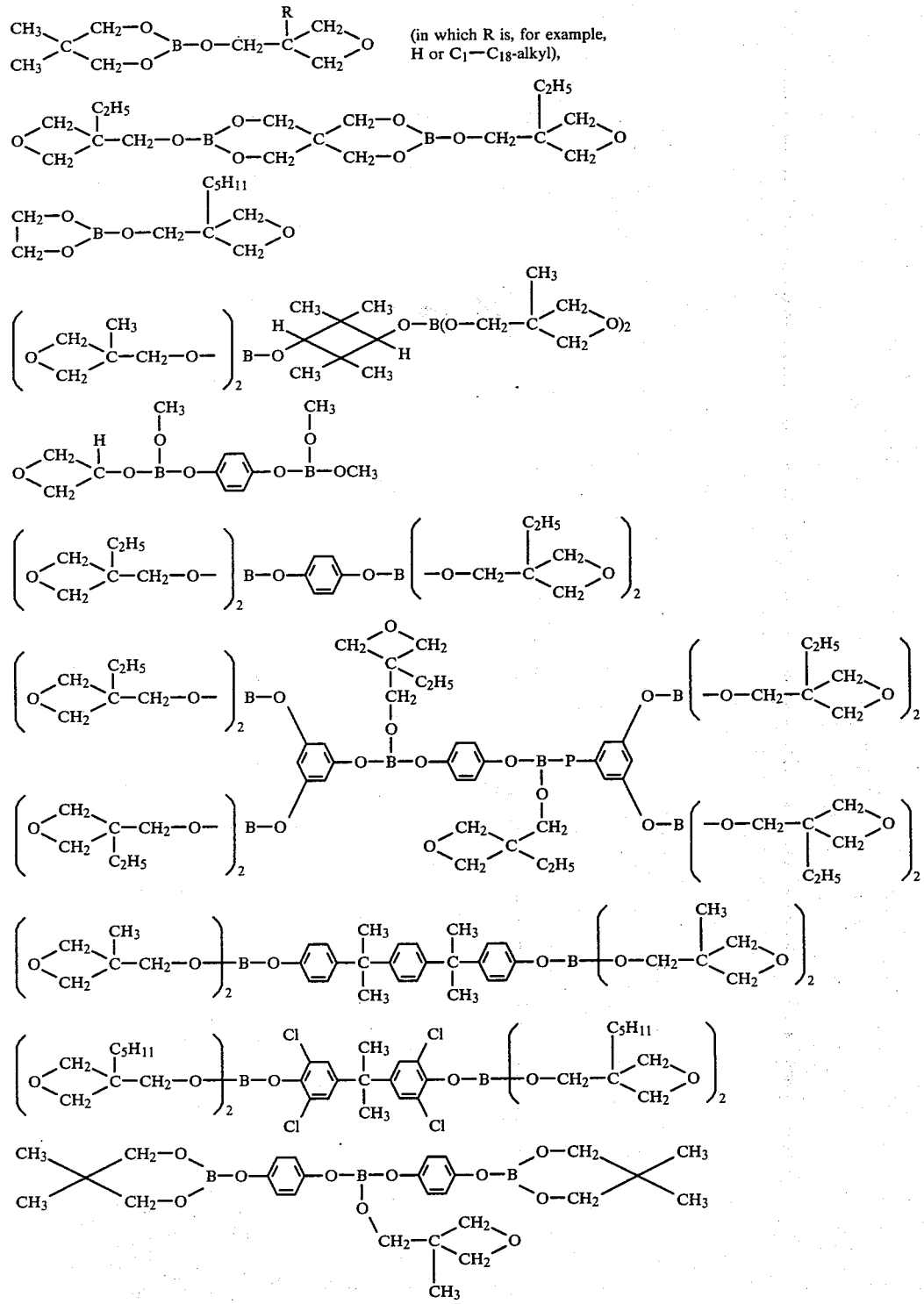

-continued

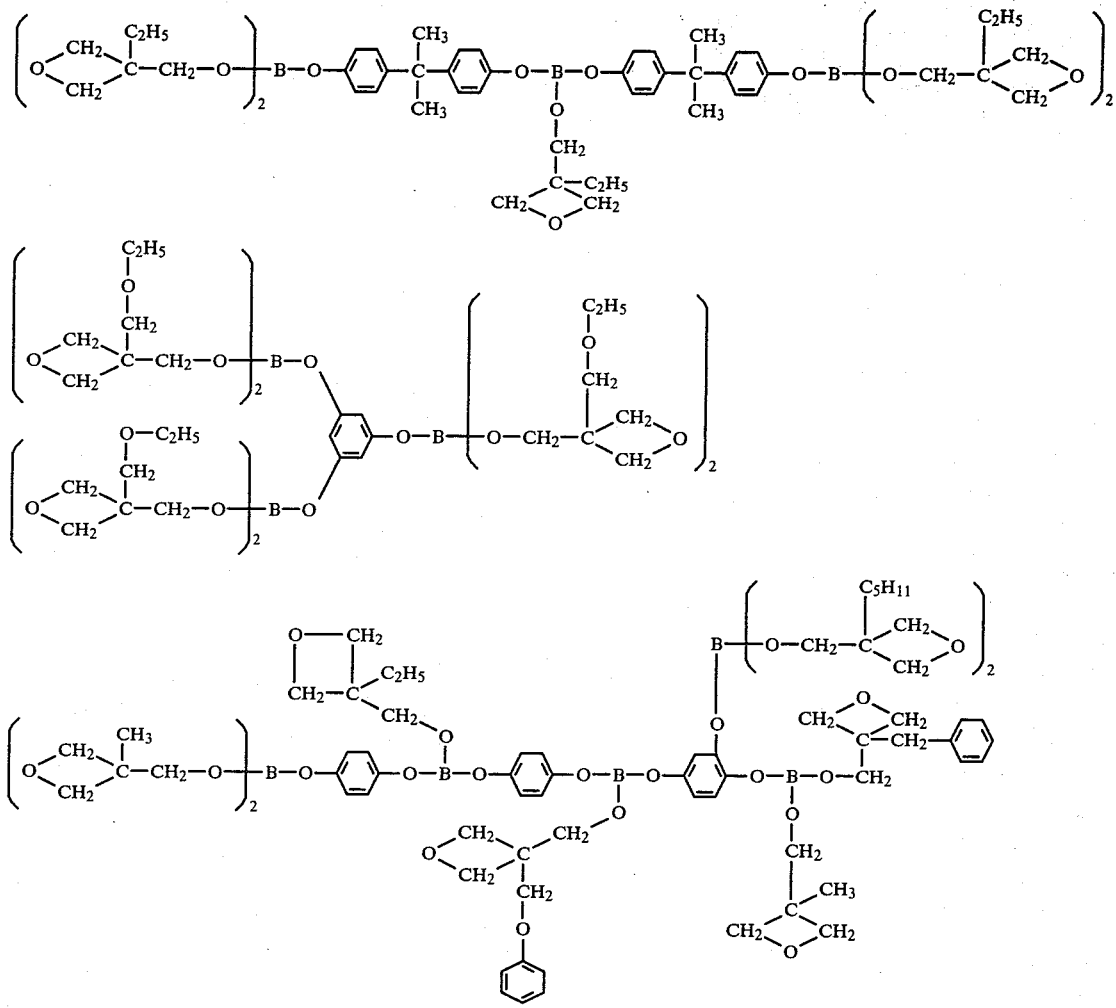

In addition to monoalcohols containing oxetane groups, monoalcohols which are free from oxetane groups and/or monohydroxyaryl compounds which are free from oxetane groups can also be incorporated into the abovementioned oxetane-containing boric acid esters, which can be used according to the invention, with polyalcohols which are free from oxetane groups and/or polyhydroxyaryl compounds which are free from oxetane groups.

Finally, boric acid esters which can be used according to the invention are also those from monoalcohols containing oxetane groups and polyalcohols, preferably dialcohols, containing oxetane groups, it being possible for monoalcohols which are free from oxetane groups and/or monohydroxyaryl compounds which are free from oxetane groups and/or polyalcohols which are free from oxetane groups and/or polyhydroxyaryl compounds which are free from oxetane groups to be optionally incorporated.

The boric acid esters, containing oxetane groups, which can be used according to the invention can be employed alone, or mixtures of several can be employed.

Boric acid esters which can preferably be used according to the invention are those which have boiling points above 150°/0.1 mm Hg.

A boric acid ester which can preferably be used is tris-(2,2-dimethylene oxide-butyl) borate

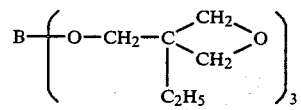

The boric acid esters which can be used according to the invention can be prepared in a manner which is in itself known, by reacting corresponding hydroxy compounds with boric acid halides in the presence of acid-binding agents, or by reacting lower alkyl or aryl esters of boric acid with the alcohols mentioned containing oxetane groups.

With regard to the reaction conditions, the literature reference "Houben Weyl Methoden der Organischen Chemie (Methods of Organic Chemistry), Volume VI/2, Sauerstoff-verbindungen I (Oxygen Compounds I), part 2, pages 190 et seq., Georg Thieme Verlag Stuttgart, 1963," is referred to.

Tris-(2,2-dimethylene oxide-butyl) borate is advantageously prepared by a procedure, based on the preparation methods described in the above-mentioned literature reference, in which the tri-n-butyl ester of boric acid, which can easily be prepared from n-butanol and boric acid by heating, H₂O being split off, is transesterified with a 50–100% molar excess of the amount of 3-ethyl-3-hydroxymethyloxetane required for the formation of the compound mentioned, in the presence of an alkaline catalyst, such as, for example, sodium methylate, by heating, the desired product being obtained in about 70–75% yield (after fractionation).

It is possible, for example, to prepare the boric acid esters, which can be used according to the invention, of polyalcohols containing oxetane groups, of polyalcohols which are free from oxetane groups and/or of polyhydroxyaryl compounds which are free from oxetane groups by, for example, transesterifying a mixture of tri-n-butyl borate with bishydroxyphenyl-2,2-propane and the calculated amount of 3-alkyl-3-hydroxyalkyloxetane by heating, optionally in the presence of alkaline catalysts, such as, for example, sodium methylate or potassium carbonate. Esters of this type can also be prepared in several stages, for example by reacting boric acid alkyl esters or aryl esters with the corresponding amounts of 3-alkyl-3-hydroxymethyloxetane and reacting the mixed esters thus obtained with polyhydric alcohols or phenols, the alcohols or phenols with the lowest boiling points being split off. It is also possible to transesterify boric acid esters which carry the radicals of the oxetane-containing alcohols mentioned earlier, with aliphatic polyalcohols or polyhydroxyaryl compounds which have higher boiling points, compared with the corresponding oxetane-containing alcohols, the aliquot portion of the oxetane-alcohol being split off.

In principle, suitable boron-free oxetane compounds which can optionally be co-used according to the invention are all the available boron-free oxetane compounds, that is to say, for example, those described in German Published Patent Specifications 2,658,849; 1,907,117 and 2,510,463 (see the corresponding U.S. Pat. No. 4,102,859) and those described in the summarizing survey by E. J. Goethals, Ind. Chim. Belge. T30, No. 6, page 559 et seq.

Examples of particularly suitable boron-free oxetane compounds are oxalic acid bis(2,2-dimethylene oxide-butyl) ester, succinic acid bis-(2,2-dimethylene oxide-butyl) ester, maleic acid bis-(2,2-dimethylene oxide-butyl) ester, fumaric acid bis-(2,2-dimethylene oxide-butyl) ester, adipic acid bis-(2,2-dimethylene oxide-butyl) ester, carbonic acid bis-(2,2-dimethylene oxide-butyl) ester, 3-pentyl-3-hydroxymethyloxetane, silicic acid tetra-(2,2-dimethylene oxide-butyl) ester, tributyl-tin (2,2-dimethylene oxide-butyl) ester and aluminum tri-(2,2-dimethylene oxide-butyl) ester.

The boron-free oxetane compounds can be prepared according to the methods described in E. J. Goethals, loc. cit.

In principle, suitable boric acid esters, which are free from oxetane groups, which can be used according to the invention are all the available boric acid esters which are free from oxetane groups, that is to say, for example, those described in U.S. Pat. Nos. 3,321,435 and 3,404,122.

Examples of suitable boric acid esters which are free from oxetane groups are tri-n-octyl borate, tri-n-dodecyl borate, tri-cyclohexyl borate, glycerol borate, trimethylolethane borate and boric acid esters of the boroxine type, such as, for example, tri-butoxy-boroxine or

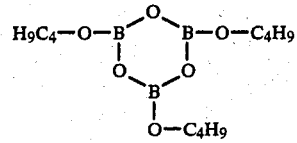

and triethoxyboroxine.

Examples of particularly suitable boric acid esters which are free from oxetane groups are tri-octyl borate and tricyclohexyl borate.

The boric acid esters which are free from oxetane groups can be prepared according to "Houben Weyl, Methoden der Organischen Chemie (Methods of Organic Chemistry), Volume VI/2, Sauerstoff-verbindungen I (Oxygen Compounds I), part 2, pages 190 et seq.," loc. cit.

Possible polycarbonates to be stabilized according to the invention are the polycondensates obtainable by reacting dihydroxydiarylalkanes with phosgene or diesters of carbonic acid by known processes, those dihydroxydiarylalkanes, the aryl radicals of which carry methyl groups or halogen atoms in the o-position and/or m-position relative to the hydroxyl group also being suitable, in addition to the unsubstituted dihydroxydiarylalkanes. Branched polycarbonates are likewise suitable.

The polycarbonates to be stabilized have average weight-average molecular weights $\overline{M}_w$ between about 10,000 and 100,000, preferably between about 20,000 and 40,000, determined by measuring the relative viscosity in $CH_2Cl_2$ at 25° C. and at a concentration of 0.5% by weight.

Examples of suitable aromatic dihydroxy compounds are hydroquinone, resorcinol, 4,4'-dihydroxydiphenyl, bis-(hydroxyphenyl)-alkanes, such as, for example, $C_1$–$C_8$-alkylene- and $C_2$–$C_8$-alkylidene-bisphenols, bis-(hydroxyphenyl)-cycloalkanes, such as, for example, $C_5$–$C_{15}$-cycloalkylene- and $C_5$–$C_{15}$-cycloalkylidene-bisphenols, and bis-(hydroxyphenyl) sulphides, ethers, ketones, sulphoxides or sulphones, and furthermore α,α'-bis-(hydroxyphenyl)-diisopropylbenzene and the corresponding nuclear-alkylated and nuclear-halogenated compounds. Polycarbonates based on 2,2-bis-(4-hydroxyphenyl)-propane (bisphenol A), 2,2-bis-(4-hydroxy-3,5-dichloro-phenyl)-propane (tetrachlorobisphenol A), 2,2-bis-(4-hydroxy-3,5-dibromophenyl)-propane (tetrabromobisphenol A), 2,2-bis-(4-hydroxy-3,5-dimethylphenyl)-propane (tetramethylbisphenol A), 2,2-bis-(4-hydroxy-3-methylphenyl)-propane and 1,1-bis-(4-hydroxyphenyl)-cyclohexane (bisphenol Z), and those based on trinuclear bis-phenols phenols such as α,α'-bis-(4-hydroxyphenyl)-p-diisopropylbenzene, are preferred.

Further bisphenols which are suitable for the preparation of a polycarbonate are described in U.S. Pat. Nos. 3,028,365; 2,999,835; 3,148,172; 3,271,368; 2,970,137; 2,991,273; 3,271,367; 3,280,078; 3,014,891; 3,879,347; 3,879,348; and 2,999,846 and in German Published Patent Specifications 2,063,050 and 2,211,956.

The borates containing oxetane groups can be added, either individually or in combination with one another, to the polycarbonates to be stabilized in amounts between about 0.01 and 1% by weight, preferably in amounts between about 0.05 and 0.2% by weight, calculated relative to the weight of pure polycarbonate resin.

These statements also apply to the combined addition of borates containing oxetane groups and boron-free oxetane compounds and to the combined addition of boric acid esters which are free from oxetane groups and boron-free oxetane compounds.

For these two stabilization variants, the amount of stabilizer mixture to be added is also between about 0.01 and 1% by weight, preferably between about 0.05 and 0.2% by weight, calculated relative to the weight of pure polycarbonate resin.

The stabilized phosphite-free polycarbonates can be prepared by a process in which the borate stabilizers to be employed according to the invention or the stabilizer mixtures, containing boric acid esters, to be employed according to the invention are either metered in the pure form into the molten polycarbonate or are optionally metered as a solution in a low-boiling solvent into the polycarbonate solution. The claimed polycarbonates, which are rendered stable to discoloration, can also be prepared by impregnating the pulverulent or granular polycarbonate with the borate stabilizer or with the stabilizer mixture containing boric acid esters, if appropriate with solutions thereof in a solvent, in a suitable mixing apparatus. The stabilized polycarbonate is then worked up by known techniques, for example by extrusion to a strand by means of a devolatilization screw and subsequent granulation to granules. These statements are applicable whether the metering-in of the borate takes place in the melt or in a solvent during the working up of the polycarbonate by known processes.

The phosphite-free polycarbonates stabilized according to the invention can also contain the known additives, such as, for example, fillers, dyestuff, pigments, mold-release agents, UV stabilizers and the like, without the effect of the added stabilizers, or stabilizer mixtures, according to the invention in the phosphite-free polycarbonate molding compositions thus obtained being thereby affected.

The stabilizers and stabilizer mixtures which can be used according to the invention can also be employed for stabilizing phosphite-free polycarbonate mixtures containing brominated polycarbonate, in combination with Ba carbonate, Sr carbonate or Ca carbonate according to U.S. Pat. Nos. 3,733,296 and 4,097,547. It is also possible to employ the stabilizers and stabilizer mixtures which can be used according to the invention for additionally stabilizing phosphite-free polycarbonates which is already stabilized according to U.S. Pat. Nos. 3,321,435 and 3,404,122 by adding esters or acids of pentavalent phosphorus.

The phosphite-free polycarbonates and polycarbonate molding compositions stabilized according to the invention are used, in particular, in cases where the shaped articles produced are exposed to high temperatures for a relatively long time, and in addition for all objects for which a high light-transmission is required. This applies preferably to use in the light sector, for example for lamp covers or glazing using polycarbonate sheets and for films.

EXAMPLES

Preparation of the polycarbonate used for stabilization test

About 454 parts of 4,4'-dihydroxydiphenyl-2,2-propane and 9.5 parts of p-tert.-butylphenol are suspended in 1.5 l of water. The oxygen is removed from the reaction mixture in a 3-necked flask, provided with a stirrer and gas inlet tube, by passing nitrogen through the reaction mixture for 15 minutes, while stirring. 355 parts of 45% strength sodium hydroxide solution and 1,000 parts of methylene chloride are then added. The mixture is cooled to 25° C. While maintaining this temperature by cooling, 237 parts of phosgene are added over a period of 120 minutes. An additional amount of 75 parts of 45% strength sodium hydroxide solution is added after 15–30 minutes, or after the take-up of phosgene has started. 1.6 parts of triethylamine are added to the solution formed and the mixture is stirred for a further 15 minutes. A highly viscous solution is obtained, the viscosity of which is controlled by adding methylene chloride. The aqueous phase is separated off. The organic phase is washed with water until free from salts and alkali. The polycarbonate is isolated from the washed solution and dried. The polycarbonate has a relative viscosity of 1.29–1.30, measured in a 0.5% strength solution in methylene chloride at 20° C. This corresponds to an approximate molecular weight of about 32,000. The polycarbonate thus obtained is extruded and granulated.

Preparation of tris-(2,2-dimethylene oxide-butyl) borate 235.2 g (1.02 mols) of boric acid tributyl ester are mixed with 712.5 g of 3-ethyl-3-hydroxyethyloxetane. 1.5 g of sodium methylate are then added. The solution is heated up to 160° C. in the course of 3 hours, while stirring and passing in nitrogen. 200 g of distillate thereby distill over a column at a head temperature of 117°–118° C. The reaction mixture is then cooled, the column is removed and a vacuum of 20 mm Hg is applied. Under these conditions, on heating the reaction mixture again up to a sump temperature of 120° C., 24 g of distillate distill off. The residue is fractionated under a high vacuum. After a first running of 365 g, which passes over from 75°–165° C./0.2 mm Hg, the reaction product distills over in the range from 165°–170°/0.2 mm Hg. 256 g = 70.4% of the theoretical amount calculated is obtained.

$n_{20}^D$: 1.4627

Analysis: found: C 61.4–6, H 9.26, B 3.1, Calculated: 50.76, 9.27, 3.09.

Preparation of the compound:

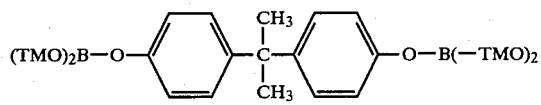

wherein

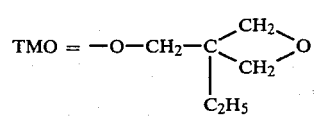

145 g (0.5 mol) of triphenyl borate, 57 g (0.25 mol) of bisphenol A and 120 g of 3-ethyl-3-hydroxyethyl-oxetane are heated to 120° C., with the addition of 0.2 g of sodium methylate, in a reaction vessel provided with a column, while stirring and passing nitrogen over, and the mixture is left at 120° C. for 1 hour. A waterpump vacuum is then applied and the mixture is heated to 165° C. in the course of 4 hours, phenol distilling off at a head temperature of 88° C. The weight of the distillate is 110 g. The column is then removed and the reaction mixture is again heated to 160° C. under a high vacuum. A further 20.1 g thereby distill off. The residue which remains is a brittle, almost colorless resin.
Calculated B 3.05%, found B 3.3%.

Preparation of the stabilized polycarbonate compositions

The granular polycarbonate prepared as described above is mixed with the amounts of various borates given in the table which follows, by so-called tumbling. Thereafter, the granules are extruded to a strand at 300° C. in a mixing screw. This strand is again cut up into granules, which are processed to standard test bars at 330° C. in an injection-molding machine.

I. Comparison experiment without the addition of borate and phosphite

II. Comparison experiment using tri-n-octyl borate

III. Comparison experiment using an ocetane compound (according to German Published Patent Specification 2,658,849 which corresponds to U.S. patent application Ser. No. 644,934, filed Dec. 24, 1975, to Axelrod)

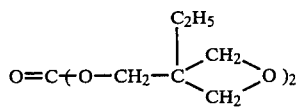

IV. Comparison experiment using a phosphite containing oxetane group (according to U.S. Pat. No. 3,794,629);

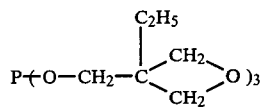

V. Comparison experiment using a mixture of a phosphite and an oxetane compound (according to German Published Patent Specification 2,510,463—see also the corresponding U.S. Pat. No. 4,102,859): a mixture of 1 mol of 2-phenoxy-5-ethyl-1,3-dioxaphosphorinane+3 mols of 3-methyl-3-hydroxymethyloxetane.

VI. Use, according to the invention, of tris-(2,2-dimethyloxide-butyl)borate.

VII. Use, according to the invention, of a mixture of 1 mol of tri-n-octyl borate and 1 mol of adipic acid bis-(3-ethyl-oxetanyl-3-methyl)ester

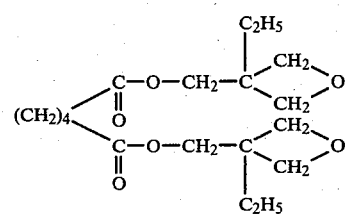

Heating ageing

The test pieces produced in the manner described above were heated at 140° C. in a drying cabinet. The light-transmission was measured with the aid of a spectrophotometer. The particular decrease in the light-transmission at 420 nm in the course of the heat treatment serves as a measure of the increasing browning of the test piece (see Table I).

TABLE I

Light-transmission in %, measured according to DIN 5,036, of PC rods at 420 nm with a sheet thickness of 4 mm

| Concentration of Stabilizer % | | hours heating at 140° C. | | | |
|---|---|---|---|---|---|
| | 0 | 1,000 | 1,500 | 2,000 | 3000 |
| I | 0 | 82.5 | 77 | 71.5 | 65 | 59 |
| II | 0.1 | 83.0 | 72.5 | 67.5 | 63.5 | 54.5 |
| III | 0.1 | 82.5 | 77 | 72 | 69 | 63 |
| IV | 0.1 | 86 | 78 | 73 | 69 | 60 |
| V | 0.1 | 84.5 | — | 73 | — | — |
| VI | 0.1 | 85.5 | 77 | 73 | 70 | 63.5 |
| VII | 0.1 | 85 | — | — | — | — |

Hydrolysis test

A number of shaped Makrolon polycarbonate articles, which have been produced with and without stabilizers, having the dimensions 50×6×4 mm (so-called standard small rods) are kept in boiling distilled water in an electrically heated round-bottomed flask. After certain intervals of time, in each case 10 rods are removed and their impact strength according to DIN 53,453, 180/R 179, and relative solution viscosity (in CH$_2$Cl at 25° C. and at a concentration of 0.5% by weight) are measured. The values obtained are given in the table which follows.

TABLE II

| | Before Boiling | | 200 Hours | | 300 Hours | | 1,250 Hours | |
|---|---|---|---|---|---|---|---|---|
| Experiment | Relative Viscosity | Impact Strength | Relative Viscosity | Impact Strength | Relative Viscosity | Impact Strength | Relative Viscosity | Impact Strength |
| Without Additive | 1.291 | n.b.[x] | 1.273 | n.b. | 1.255 | n.b. | 1.211 | 8 × 23.9 2 × n.b. |
| 0.1 IV | 1.288 | n.b. | 1.177 | 5.0 | — | — | — | — |
| 0.1 VI | 1.286 | n.b. | 1.276 | n.b. | 1.266 | n.b. | 1.248 | 8 × n.b. 2 × 67.0 |

[x]n.b. = not broken

What is claimed is:

1. A polycarbonate molding composition comprising a phosphite-free polycarbonate and a stabilizing additive selected from the group consisting of
   (i) a boric acid ester containing at least one oxetane group of the structural formulae I, IIIa, or IIIb

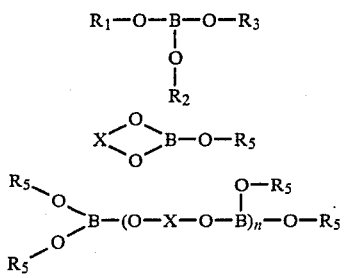

wherein at least one of the radicals $R_1$, $R_2$ and $R_3$ is the radical of a monoalcohol containing at least one oxetane group, while at most 2 of the radicals $R_1$, $R_2$ and $R_3$ are radicals of primary, secondary or tertiary aliphatic or cycloaliphatic monoalcohols which are free from oxetane groups or monohydroxyaryl compounds which are free from oxetane groups, X is the radical of a dialcohol HO-X-OH containing at least one oxetane group, in which X is an organic radical, containing at least one oxetane group, with between about 5 and 20 C atoms, $R_5$ is the radical of a monoalcohol which is free from oxetane groups or of a monohydroxyaryl compound which is free from oxetane groups and n is an integer from about 1 to 10, (ii) a mixture of a boric acid ester containing at least one oxetane group of the formulae I, IIIa or IIIb and a boron-free oxetane compound wherein the ratio of boron atoms to oxetane groups is between about 1:2 and 1:10 and (iii) a mixture of a boric acid ester which is free from oxetane groups and a boron-free oxetane compound wherein the ratio of boron atoms to oxetane groups is between about 1:2 and 1:10, characterized in that the stabilizing additive is present in amounts between about 0.01 and 1% by weight, relative to the weight of pure polycarbonate resin.

2. The polycarbonate molding composition of claim 1 wherein the radical of a monoalcohol containing at least one oxetane group is derived from monoalcohols containing oxetane groups of the formula (II)

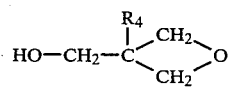

wherein $R_4$ is H, $C_1$–$C_{18}$-alkyl, $C_3$–$C_{12}$-cycloalkyl, alkyl-substituted $C_6$–$C_{14}$-aryl, $C_7$–$C_{18}$-aralkyl or —CH$_2$—O—R$_5$, wherein $R_5$ is $C_1$–$C_{18}$-alkyl, $C_3$–$C_{12}$-cycloalkyl, alkyl-substituted $C_6$–$C_{14}$-aryl or $C_7$–$C_{18}$-aralkyl.

3. The polycarbonate molding composition of claim 1, wherein the boric acid ester containing at least one oxetane group is tris-(2,2-dimethylene oxide-butyl)borate.

4. The polycarbonate molding compositions of claim 1, wherein the boron-free oxetane compounds are selected from the group consisting of oxalic acid bis-(2,2-dimethylene oxide-butyl)ester, succinic acid bis-(2,2-dimethylene oxide-butyl)ester, maleic acid bis-(2,2-dimethylene oxide-butyl)ester, fumaric acid bis-(2,2-dimethylene oxide-butyl)ester, adipic acid bis-(2,2-dimethylene oxide-butyl)ester, carbonic acid bis-(2,2-dimethylene oxide-butyl)ester, 3-pentyl-3-hydroxymethyloxetane, silicic acid tetra-(2,2-dimethylene oxide-butyl)ester, tributyl-tin (2,2-dimethylene oxide-butyl)ester and aluminum tri-(2,2-dimethylene oxide-butyl)ester.

5. The polycarbonate molding compositions of claim 1, wherein the boric acid esters which are free from oxetane groups are selected from the group consisting of tri-n-octyl borate, tri-n-dodecyl borate, tricyclohexyl borate, glycerol borate, trimethylolethane borate, tri-butoxy-boroxine and triethoxy boroxine.

6. The polycarbonate molding composition of claim 1, wherein the stabilizing additive is present in amounts between about 0.05 and 0.2% by weight, relative to the weight of pure polycarbonate resin.

7. The polycarbonate molding composition of claim 6, wherein the molar ratio of boron atoms to oxetane groups in the stabilizing additive is between about 1:2 and 1:10.

8. The polycarbonate molding composition of claim 1 or 6, wherein the molar ratio of boron atoms to oxetane groups is between about 1:3 and 1:6.

9. The polycarbonate molding composition of claim 1, wherein a mixture of tri-n-octyl-borate and adipic acid bis-(3-ethyl-oxetanyl-3-methyl)ester is employed.

10. A process for stabilizing a phosphite-free polycarbonate molding composition comprising incorporating a stabilizing additive selected from the group consisting of (i) a boric acid ester containing at least one oxetane group of the structural formulae I, IIIa, or IIIb,

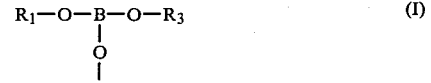

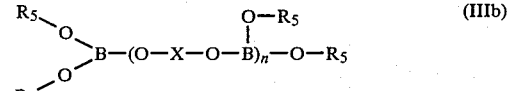

wherein at least one of the radicals $R_1$, $R_2$ and $R_3$ is the radical of a monoalcohol containing at least one oxetane group, while at most 2 of the radicals $R_1$, $R_2$ and $R_3$ are radicals of primary, secondary or tertiary aliphatic or cycloaliphatic monoalcohols which are free from oxetane groups or monohydroxyaryl compounds which are free from oxetane groups, X is the radical of a dialcohol HO-X-OH containing at least one oxetane group, in which X is an organic radical, containing at least one oxetane group, with between about 5 and 20 C atoms, $R_5$ is the radical of a monoalcohol which is free from oxetane groups or of a monohydroxyaryl compound which is free from oxetane groups and n is an integer from about 1 to 10, (ii) a mixture of a boric acid ester containing at least one oxetane group of the formulae I, IIIa or IIIb and a boron-free oxetane compound wherein the ratio of boron atoms to oxetane groups is between about 1:2 and 1:10 and (iii) a mixture of a boric acid ester which is free from oxetane groups and a boron-free oxetane compound wherein the ratio of boron atoms to oxetane groups is between about 1:2 and 1:10, in an amount between about 0.01 and 1% by weight, relative to the weight of pure polycarbonate resin.

* * * * *